(12) United States Patent
Suzuki et al.

(10) Patent No.: US 8,834,032 B2
(45) Date of Patent: Sep. 16, 2014

(54) TILTING PAD JOURNAL BEARING AND ROTATING MACHINE PROVIDED WITH THE SAME

(75) Inventors: Kenta Suzuki, Hitachinaka (JP); Makoto Hemmi, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/000,358

(22) PCT Filed: Feb. 21, 2011

(86) PCT No.: PCT/JP2011/053739
§ 371 (c)(1),
(2), (4) Date: Aug. 19, 2013

(87) PCT Pub. No.: WO2012/114445
PCT Pub. Date: Aug. 30, 2012

(65) Prior Publication Data
US 2013/0330030 A1    Dec. 12, 2013

(51) Int. Cl.
*F16C 17/00* (2006.01)
*F16C 33/10* (2006.01)
*F16C 17/03* (2006.01)

(52) U.S. Cl.
CPC ............. *F16C 17/03* (2013.01); *F16C 33/1085* (2013.01)
USPC .......................................... 384/311; 384/322

(58) Field of Classification Search
CPC .... F16C 17/03; F16C 17/035; F16C 32/0666; F16C 33/106; F16C 33/1075; F16C 33/108; F16C 33/1085
USPC .......... 384/117, 224, 306–309, 311, 312, 322
See application file for complete search history.

(56) References Cited

U.S. PATENT DOCUMENTS 3,339,990 A * 9/1967 Wendt ............................ 384/311
3,604,767 A * 9/1971 Decker ......................... 384/312
(Continued)

FOREIGN PATENT DOCUMENTS

| EP | 2 339 192 A1 | 6/2011 |
| JP | 9-144750 A | 6/1997 |

(Continued)

OTHER PUBLICATIONS

Japanese-language Written Opinion (PCT/ISA/237) dated Mar. 15, 2011 with English translation (six (6) pages).

(Continued)

*Primary Examiner* — Alan B Waits
(74) *Attorney, Agent, or Firm* — Crowell & Moring LLP

(57) ABSTRACT

A tilting pad journal bearing includes a pads disposed on the outer circumferential side of a rotating shaft, pivots supporting pads such that the pads are tiltable, a plurality of guides disposed between pads, and a casing. The pads have an oil passage extending from side to side in the circumferential direction, the guides having first and second guide passages. The first guide passage introduces lubricating oil from an oil-supply hole of the casing and exhaust it to the oil passage of the pad adjacent to the guide on the other side in the circumferential direction. The second guide passage introduces lubricating oil from the oil passage of the pad adjacent to the guide and on one side in the circumferential direction and exhaust it to between the inner circumferential surface of the pad on the other side and the outer circumferential surface of the rotating shaft.

19 Claims, 10 Drawing Sheets

(56) References Cited

U.S. PATENT DOCUMENTS

| | | | |
|---|---|---|---|
| 3,768,377 A * | 10/1973 | Engel et al. | 91/486 |
| 4,322,116 A * | 3/1982 | Heinemann et al. | 384/100 |
| 5,879,085 A * | 3/1999 | Ball et al. | 384/307 |
| 6,736,542 B2 * | 5/2004 | Hudson | 384/117 |
| 7,758,247 B2 * | 7/2010 | Geiger | 384/312 |
| 8,366,323 B2 * | 2/2013 | Waki et al. | 384/312 |
| 8,371,756 B2 * | 2/2013 | Waki et al. | 384/311 |
| 2003/0142890 A1 * | 7/2003 | Miller | 384/117 |
| 2013/0330030 A1 * | 12/2013 | Suzuki et al. | 384/322 |
| 2013/0336605 A1 * | 12/2013 | Buguin et al. | 384/114 |

FOREIGN PATENT DOCUMENTS

| | | | |
|---|---|---|---|
| JP | 2003-113834 A | 4/2003 | |
| JP | 2008151239 A | 7/2008 | |
| JP | 2009-63015 A | 3/2009 | |

OTHER PUBLICATIONS

Tribology Handbook Edited by Japan Society of Tribologists, Yokendo, 2001, pp. 53-57.

Japanese-language Written Opinion dated Mar. 15, 2011 (Three (3) pages).

International Search Report dated Mar. 15, 2011 (Five (5) pages).

* cited by examiner

TILTING PAD JOURNAL BEARING AND ROTATING MACHINE PROVIDED WITH THE SAME

TECHNICAL FIELD

The present invention relates to a tilting pad journal bearing and a rotating machine provided with the journal bearing.

BACKGROUND ART

For rotating machines operated at high speeds, a tilting pad journal bearing as shown in non-patent document 1 is often employed. This tilting pad journal bearing generally includes a plurality of pads disposed on the outer circumferential side of a rotating shaft and subjected to radial load on the rotating shaft, a plurality of pivots each supporting a corresponding one of the pads in such a manner that the pads are tiltable, and a casing housing the pads and the pivots. When the rotating shaft is rotated, lubricating oil is introduced between the rotating shaft and the pads to form wedged oil films therebetween. In this case, since the pad can be tilted, the rotating shaft is eccentric and a load is applied to the rotating shaft in a direction corresponding to the eccentricity, which attains good vibration stability. Thus, the tilting pad journal bearings are widely employed for high-speed rotating machines such as steam turbines, gas turbines and centrifugal compressors.

In recent years, rotating machines such as steam turbines and the like have been enlarged in order to increase efficiency. A tilting pad journal bearing supporting a rotating shaft of the rotating machine needs to catch up with high circumferential velocity and high surface pressure attributable to the enlargement. Specifically, the inner circumferential surface of a pad, which is a sliding surface with the rotating shaft, generates friction heat and seizure is more likely to occur with higher circumferential velocity and higher surface pressure. It is, therefore, necessary to provide some contrivance to reduce the temperature of the inner circumferential surface of the pad.

In view of the above, the conventional technology described in e.g. patent document 1 has a lubricating oil supply passage formed inside each of pads so as to cool the pad. The lubricating oil supply passage extends from one end side to the other end side of the pad in the circumferential direction. A flexible pipe is coupled to the inlet of the lubricating oil supply passage formed on one end side (in other words, on the downstream side in the rotational direction of the rotating shaft), in the circumferential direction, of the pad. A blowoff block is integrally secured to the other end side (in other words, on the upstream side in the rotational direction of the rotating shaft), in the circumferential direction, of the pad. An oil-lead passage of the blowoff block is connected to the outlet of the lubricating oil supply passage formed on the other end side, in the circumferential direction, of the pad. In this way, lubricating oil is led to the lubricating oil supply passage of the pad via the flexible pipe, is caused to flow in the lubricating oil supply passage of the pad in the direction opposite to the rotational direction of the rotating shaft and is led to the oil-leading passage of the blowoff block. The lubricating oil is then sprayed toward the outer circumferential surface of the rotating shaft via nozzles of the blowoff block. Thus, the pad can effectively be cooled and lubricated at a small oiling quantity without a stirring loss.

PRIOR-ART DOCUMENTS

Patent Documents

Patent document: JP-2003-113834-A (see FIGS. 1 and 2)

Non-Patent Document

Non-patent document: Tribology Handbook Edited by Japan Society of Tribologists, Yokendo, 2001, pp 53-57

SUMMARY OF THE INVENTION

Problem to be Solved by the Invention

However, the conventional technology described above has room for improvement as below. In the conventional technology described in the above patent document 1, the flexible pipe is coupled to the inlet of the lubricating oil supply passage of the pad. In addition, the oil-leading passage of the blowoff block is connected to the outlet of the lubricating oil supply passage of the pad. Thus, the conventional technology described above has room for the improvement in the reduction of the number of component parts.

It is an object of the present invention to provide a tilting pad journal bearing that can reduce an oiling quantity while reducing the number of component parts.

Means for Solving the Problem

To achieve the above object, according to a first invention, a tilting pad journal bearing includes: a plurality of pads disposed on an outer circumferential side of a rotating shaft and subjected to radial load on the rotating shaft; a plurality of pivots each supporting a corresponding one of the plurality of pads in such a manner that the pads are tiltable; and a casing housing the plurality of pads and the plurality of pivots; the plurality of pads each having an oil passage formed in the inside thereof, the oil passage extending from one side to the other side in the circumferential direction; wherein the journal bearing includes a plurality of guides each disposed between corresponding ones of the plurality of pads, the plurality of guides each have a first guide passage formed in the inside thereof and have a second guide passage formed in the inside thereof or between an inner circumferential surface of the guide and an outer circumferential surface of the rotating shaft, the first guide passage being adapted to introduce lubricating oil therein from an oil-supply hole of the casing and exhaust the lubricating oil to the oil passage of the pad that is adjacent to the guide and on the other side in the circumferential direction, the second guide passage being adapted to introduce lubricating oil therein from the oil passage of the pad that is adjacent to the guide and on one side in the circumferential direction and exhaust the lubricating oil to between an inner circumferential surface of the pad on the other side in the circumferential direction and the outer circumferential surface of the rotating shaft.

As described above, the guides each formed with the first guide passage and the second guide passage are installed; therefore, the first invention can reduce an oiling quantity while reducing the number of component parts, compared with the conventional technology described in e.g. patent document 1.

To achieve the above object, according to a second invention, a tilting pad journal bearing includes: a plurality of pads disposed on an outer circumferential side of a rotating shaft and subjected to radial load on the rotating shaft; a plurality of pivots each supporting a corresponding one of the plurality of pads in such a manner that the pads are tiltable; and a casing housing the plurality of pads and the plurality of pivots; each of at least two pads of the plurality of pads having an oil passage formed in the inside thereof, the oil passage extending from one side to the other side in the circumferential direction; wherein the journal bearing includes at least one first guide disposed between the at least two pads each formed with the oil passage in the inside therein, and a second guide and a third guide disposed on both circumferential outsides of the at least two pads each formed with the oil passage in the inside thereof, the first guide has a first guide passage formed in the inside thereof and has a second guide passage formed in the inside thereof or between an inner circumferential surface thereof and an outer circumferential surface of the rotating shaft, the first guide passage being adapted to introduce lubricating oil therein from an oil-supply hole of the casing and exhaust the lubricating oil to the oil passage of the pad that is adjacent to the first guide and on the other side in the circumferential direction, the second guide passage being adapted to introduce lubricating oil therein from the oil passage of the pad that is adjacent to the first guide and on one side in the circumferential direction and exhaust the lubricating oil to between an inner circumferential surface of the pad on the other side in the circumferential direction and the outer circumferential surface of the rotating shaft, the second guide has a first guide passage formed in the inside thereof, the first guide passage being adapted to introduce lubricating oil therein from the oil-supply hole of the casing and exhaust the lubricating oil to the oil passage of the pad that is adjacent to the second guide and on the other side in the circumferential direction, and the third guide has a second guide passage formed in the inside thereof or between an inner circumferential surface thereof and the outer circumferential surface of the rotating shaft, the second guide passage being adapted to introduce lubricating oil therein from the oil passage of the pad that is adjacent to the third guide and on the one side in the circumferential direction and exhaust the lubricating oil to between the outer circumferential surface of the rotating shaft and the inner circumferential surface of the pad that is adjacent to the third guide and on the other side in the circumferential direction.

As described above, the first guide formed with the first guide passage and the second guide passage is installed; therefore, the second invention can reduce an oiling quantity while reducing the number of component parts.

To achieve the above object, according to a third invention, a rotating machine includes at least one tilting pad journal bearing according to the first or second invention described above.

Effect of the Invention

According to the present invention, it is possible to reduce an oiling quantity while reducing the number of component parts.

MODE FOR CARRYING OUT THE INVENTION

Figure 1:
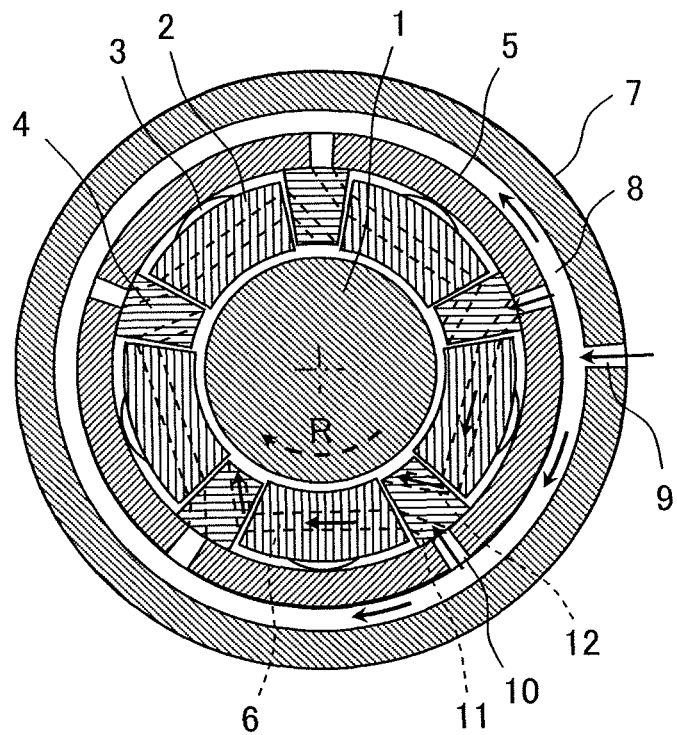
FIG. 1 is a radial cross-sectional view illustrating the structure of a tilting pad bearing according to a first embodiment of the present invention.
Figure 2:
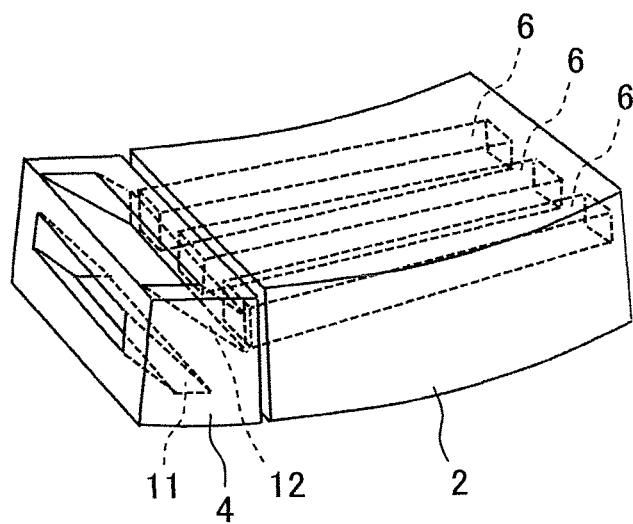
FIG. 2 is a perspective view illustrating the structure of a pad and a guide according to the first embodiment of the present invention.

A first embodiment of the present invention will be described with reference to FIGS. 1 and 2. FIG. 1 is a radial cross-sectional view illustrating the structure of a tilting pad bearing according to the present embodiment. FIG. 2 is a perspective view illustrating the structure of a pad and a guide according to the present embodiment.

Referring to FIGS. 1 and 2, the tilting pad bearing includes a plurality of (five in the present embodiment) pads 2 disposed on the outer circumferential side of a rotating shaft 1 and subjected to radial load on the rotating shaft 1; a plurality of (five in the present embodiment) pivots 3 each of which supports a corresponding one of the pads 2 so as to be able to tilt; a plurality of (five in the present embodiment) metal guides 4 each disposed between corresponding ones of the pads 2; and a casing 5 which houses the pads 2, the pivots 3 and the guides 4 and in which lubricating oil is stored. Incidentally, the rotating shaft 1 is designed to rotate in the direction (clockwise) indicated by a dotted line arrow R in FIG. 1.

The pad 2 has an inner circumferential surface made of a low-melting-point alloy such as white metal or the like. The inner circumferential surface acts as a sliding surface with the rotating shaft 1. To cool the pad 2, the pad 2 is formed therein with oil passages 6. The oil passages 6 extend, e.g. linearly, from a front end on one side (in other words, on the upstream side in the rotational direction of the rotating shaft 1) to a rear end on the other side (in other words, on the downstream side in the rotating direction of the rotating shaft 1) in the circumferential direction. Incidentally, three oil passages 6 are arranged in the width direction of each pad 2 as illustrated in FIG. 2 in the present embodiment. In addition, FIG. 2 illustrates the case where the oil passage 6 has a square cross-section. However, the oil passage 6 may have a circular cross-section (the same holds true for FIGS. 5, 14 and 15 described later).

A substantially cylindrical bearing housing 7 is installed on the outer circumferential side of the tilting pad bearing (i.e., on the outer circumferential side of the casing 5). The bearing housing 7 is formed on its inner circumferential surface with a circumferential oil-leading groove 8 extending over the whole circumference thereof. The bearing housing 7 is formed with a radial oil-leading hole 9 which allows the circumferential oil-leading groove 8 on the inner circumferential side to communicate with the outer circumferential side. The casing 5 of the tilting pad bearing is formed with a plurality of (five in the present embodiment) oil-supply holes 10 at respective circumferential positions corresponding to the plurality of respective guides 4.

The guides 4, which are a substantial part of the present embodiment, are each secured to the inner circumferential surface of the casing 5. The guides 4 each have a first guide passage 11 formed on the inside thereof. The first guide passage 11 is adapted to introduce lubricating oil therein from the oil-supply hole 10 of the casing 5 and exhaust it to the oil passage 6 of the pad 2 that is adjacent to the guide 4 and on the other side (in other words, on the downstream side in the rotational direction of the rotating shaft 1) in the circumferential direction. In addition, the guides 4 each have a second guide passage 12 formed on the inside thereof. The second guide passage 12 is adapted to introduce lubricating oil therein from the oil passage 6 of the pad 2 that is adjacent to the guide 4 and on one side (i.e., on the upstream side in the rotational direction of the rotating shaft 1) in the circumferential direction and exhausts it to between the inner circumferential surface of the pad 2 on the other side in the circumferential direction and the outer circumferential surface of the rotating shaft 1. Incidentally, a gap between the guide 4 and the pad 4 is set at such minute spacing (e.g. approximately 1 mm) as not to interfere with each other even if the pad 4 tilts.

A description is next given of the operation, function and effect of the present embodiment.

Lubricating oil supplied from the radial oil-leading hole 9 of the bearing housing 7 is led to the first guide passage 11 of each guide 4 via the circumferential oil-leading groove 8 of the bearing housing 7 and the oil-supply hole 10 of the casing 5. Then, the lubricating oil is led to the oil passage 6 of the pad 2 that is adjacent to the corresponding guide 4 and on the other side in the circumferential direction (in other words, on the downstream side in the rotational direction of the rotating shaft 1). The lubricating oil flows in the oil passages 6 of each pad 2 in the rotational direction of the rotating shaft 1, is led to the second guide passage 12 of each guide 4 and led to between the outer circumferential surface of the rotating shaft 1 and the inner circumferential surface of the pad 2 that is adjacent to the corresponding guide 4 and on the other side in the circumferential direction. In this way, the pads can effectively be cooled and lubricated at a small oiling quantity without a stirring loss. Thus, the tilting pad bearing of the present embodiment can deal with high circumferential velocity and high surface pressure.

In the present embodiment, the guides 4 are each formed with the first guide passage 11 and the second guide passage 12. Therefore, the present embodiment can reduce an oiling quantity while reducing the number of component parts compared with the case where the flexible pipe and the blowoff block are provided as in the conventional technology described in e.g. patent document 1. Because of the reduced number of component parts, work for manufacturing and installing the bearing can be simplified. Because of the reduced oiling quantity, the downsizing of the oil supply device and the reduction of an operation cost can be achieved.

Since the metal guides 4 are installed, durability and earthquake-resistance can be enhanced and thus reliability can be increased compared with the case of providing the flexible pipe with flexibility as in the conventional technology described in patent document 1.

Figure 3:
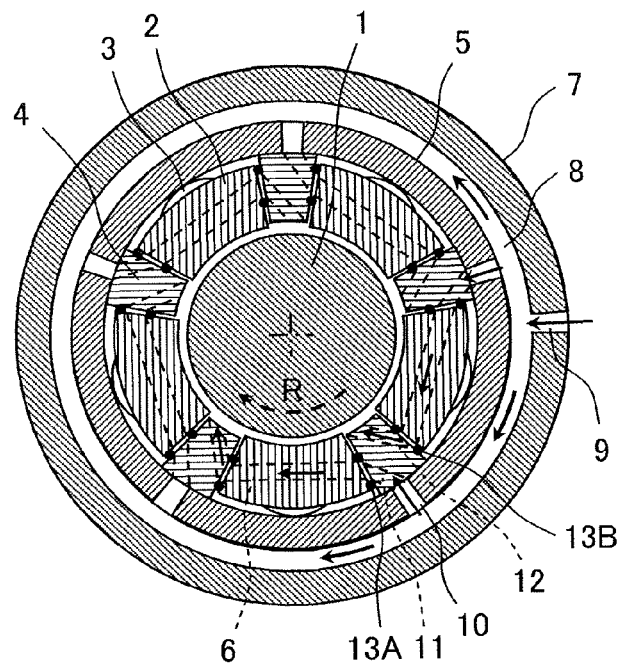
FIG. 3 is a radial cross-sectional view illustrating the structure of a tilting pad bearing according to a first modification of the present invention.

Incidentally, although the first embodiment does not particularly give a description, an elastic seal member (an O-ring) 13A may be installed in a gap between each of the guides 4 and a corresponding one of the pads 2 that is adjacent thereto and on the other side in the circumferential direction as in a modification illustrated in FIG. 3. This prevents the leakage of the lubricating oil led from the first guide passage 11 of the guide 4 to the oil passage 6 of the pad 2 on the other side in the circumferential direction. In addition, an elastic seal member (an O-ring) 133 may be installed in a gap between each of the guides 4 and a corresponding one of the pads 2 that is adjacent thereto and on the one side in the circumferential direction. This prevents the leakage of the lubricating oil led from the oil passage 6 of the pad 2 on the one side in the circumferential direction to the second guide passage 12 of the guide 4. The modification described above can further reduce the oiling quantity.

Figure 4:
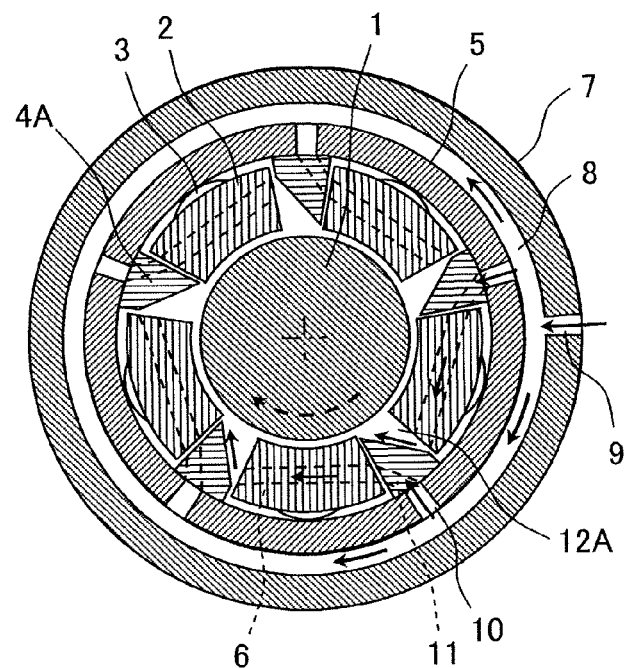
FIG. 4 is a radial cross-sectional view illustrating the structure of a tilting pad bearing according to a second embodiment of the present invention.
Figure 5:
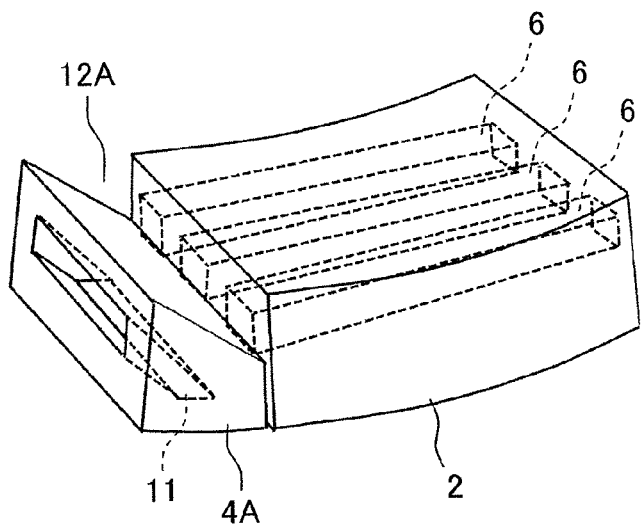
FIG. 5 is a perspective view illustrating the structure of a pad and a guide according to the second embodiment of the present invention.

A second embodiment of the present invention is described with reference to FIGS. 4 and 5. FIG. 4 is a radial cross-sectional view illustrating the structure of a tilting pad bearing according to the present embodiment. FIG. 5 is a perspective view illustrating the structure of a pad and a guide according to the present embodiment. Incidentally, the same portions in FIGS. 4 and 5 as those of the first embodiment are attached with like reference numerals and their explanations are arbitrarily omitted.

The tilting pad bearing in the present embodiment has a plurality of (five in the present embodiment) metal guides 4A each disposed between corresponding ones of a plurality of (five in the present embodiment) pads 2. Similarly to the guide 4 of the first embodiment, the guide 4A is formed therein with a first guide passage 11. The first guide passage 11 is adapted to introduce lubricating oil therein from the oil-supply hole 10 of the casing 5 and exhaust it to the oil passage 6 of the pad 2 that is adjacent to the guide 4 and on the other side in the circumferential direction.

Each of the guides 4A has an inner circumferential surface formed as a sloping surface. The sloping surface extends from one side (in other words, on the downstream side in the rotational direction of the rotating shaft 1) in the circumferential direction toward the other side (in other words, on the downstream side in the rotating direction of the rotational shaft 1) in the circumferential direction, and slopes toward the radial inside of the rotating shaft 1. A second guide passage 12A is defined between this inner circumferential surface and the outer circumferential surface of the rotating shaft.

Also the embodiment configured as described above can reduce the oiling quantity while reducing the number of component parts similarly to the first embodiment.

Figure 6:
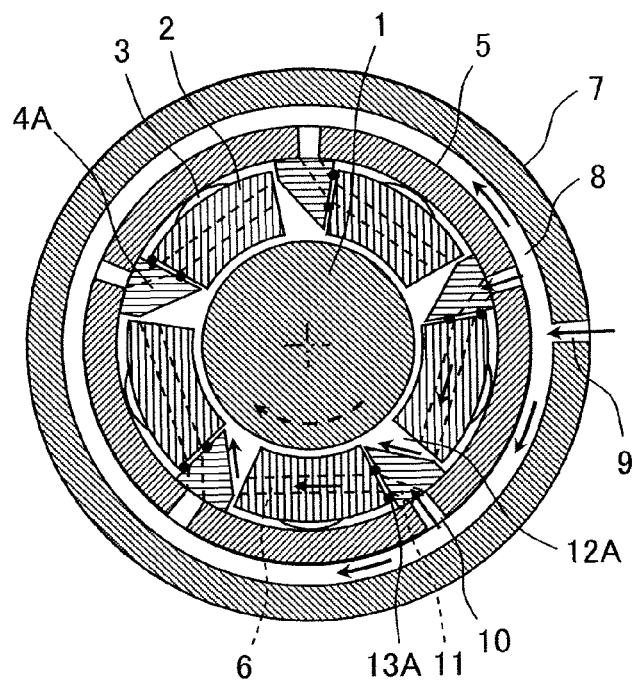
FIG. 6 is a radial cross-sectional view illustrating the structure of a tilting pad bearing according to a second modification of the present invention.

Incidentally, although the second embodiment does not particularly give a description, an elastic seal member (an O-ring) 13A may be installed in a gap between each of the guides 4 and a corresponding one of the pads 2 that is adjacent thereto and on the other side in the circumferential direction as in a modification illustrated in FIG. 6. This prevents the leakage of the lubricating oil led from the first guide passage 11 of the guide 4 to the oil passage 6 of the pad 2 on the other side in the circumferential direction. Also the modification described above can further reduce the oiling quantity.

Figure 7:
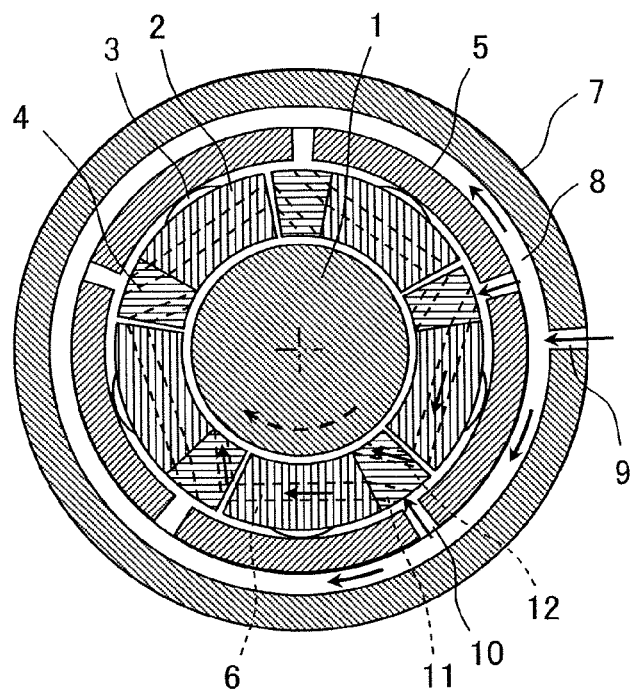
FIG. 7 is a radial cross-sectional view illustrating the structure of a tilting pad bearing according to a third embodiment of the present invention.

A third embodiment of the present invention is described with reference to FIG. 7. FIG. 7 is a radial cross-sectional view illustrating the structure of a tilting pad bearing according to the present embodiment. Incidentally, the same portions in FIG. 7 as those of the first embodiment are attached with like reference numerals and their explanations are arbitrarily omitted.

In the present embodiment, the guides 4 are not secured to the inner circumferential surface of the casing 5. Instead each of the guides 4 is joined to a corresponding one of pads 2 that is adjacent thereto and on the other side in the circumferential direction so that they become unified. Specifically, the guide 4 is designed to tilt along with the pad 2.

Also the embodiment configured as described above can reduce the oiling quantity while reducing the number of component parts similarly to the first embodiment described above. In addition, the guide 4 and the pad 2 are integrated with each other; therefore, work for installing the guide 4 can be eliminated.

Figure 8:
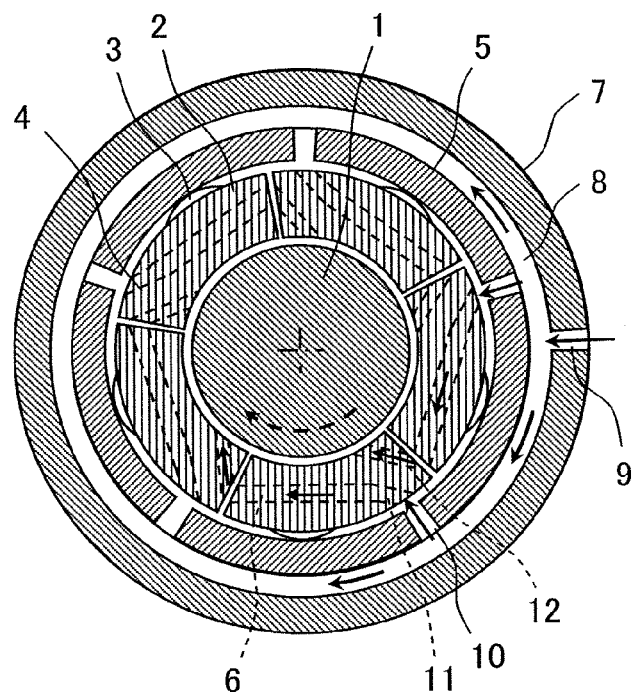
FIG. 8 is a radial cross-sectional view illustrating the structure of a tilting pad bearing according to a third modification of the present invention.

Incidentally, the third embodiment described above takes, as an example, the case where the guide 4 and the pad 2 are each formed as a single piece and are joined together. However, the present invention is not limited to this case. As in a modification illustrated in e.g. FIG. 8, the guide 4 and the pad 2 may be formed integrally with each other from the start. Also the modification mentioned above can produce the same effects as above.

Figure 9:
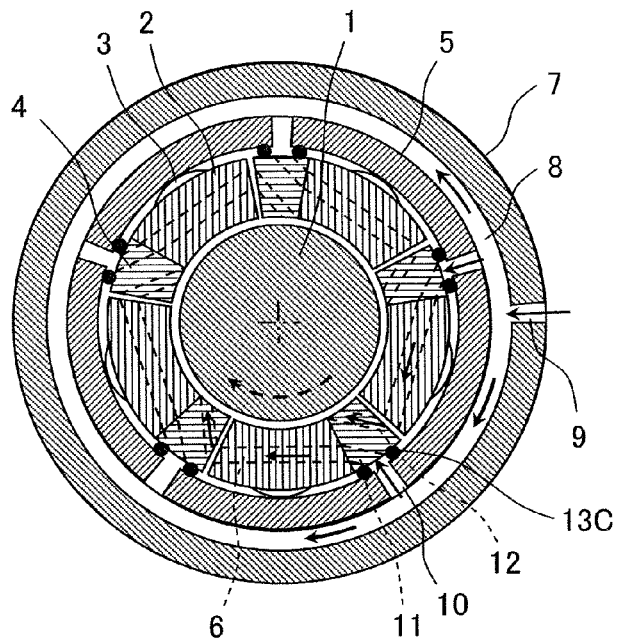
FIG. 9 is a radial cross-sectional view illustrating the structure of a tilting pad bearing according to a fourth modification of the present invention.

Although the third embodiment does not particularly give a description, an elastic seal member (an O-ring) 13C may be installed in a gap between each of the guides 4 and the casing 5 as in a modification illustrated in FIG. 9. This prevents the leakage of the lubricating oil led from the oil-supply hole 10 of the casing 5 to the first guide passage 11 of the guide 4. The modification described above can further reduce the oiling quantity.

Figure 10:
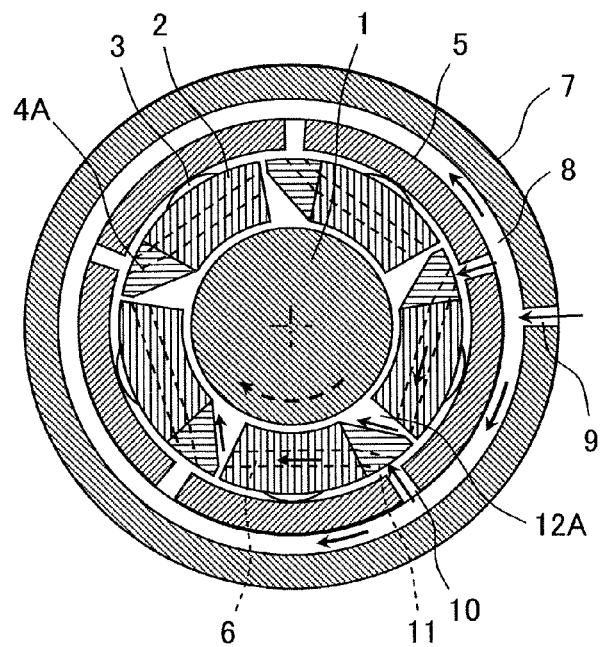
FIG. 10 is a radial cross-sectional view illustrating the structure of a tilting pad bearing according to a fourth embodiment of the present invention.

A fourth embodiment of the present invention is described with reference to FIG. 10. FIG. 10 is a radial cross-sectional view illustrating the structure of a tilting pad bearing according to the present embodiment. Incidentally, the same portions in FIG. 10 as those of the second embodiment are attached with like reference numerals and their explanations are arbitrarily omitted.

In the present embodiment, guides 4A are each not secured to the inner circumferential surface of a casing 5. Instead each of the guides 4A is joined to a corresponding one of pads 2 that is adjacent thereto and on the other side in the circumferential direction so that they become unified. Specifically, the guide 4A is designed to tilt along with the pad 2.

Also the embodiment configured as described above can reduce the oiling quantity while reducing the number of component parts similarly to the above embodiments. In addition, the guide 4 and the pad 2 are integrated with each other; therefore, work for installing the guide 4 can be eliminated.

Incidentally, the fourth embodiment described above takes, as an example, the case where the guide 4A and the pad 2 are each formed as a single piece and are joined together. However, the present invention is not limited to this case. As in a modification illustrated in e.g. FIG. 11, the guide 4A and the pad 2 may be formed integrally with each other from the start. Also the modification mentioned above can produce the same effects as above.

Figure 11:
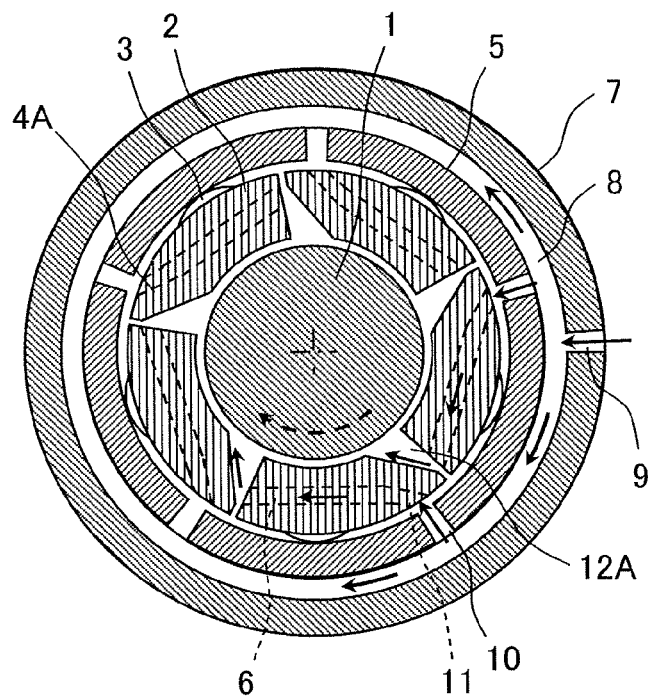
FIG. 11 is a radial cross-sectional view illustrating the structure of a tilting pad bearing according to a fifth modification of the present invention.
Figure 12:
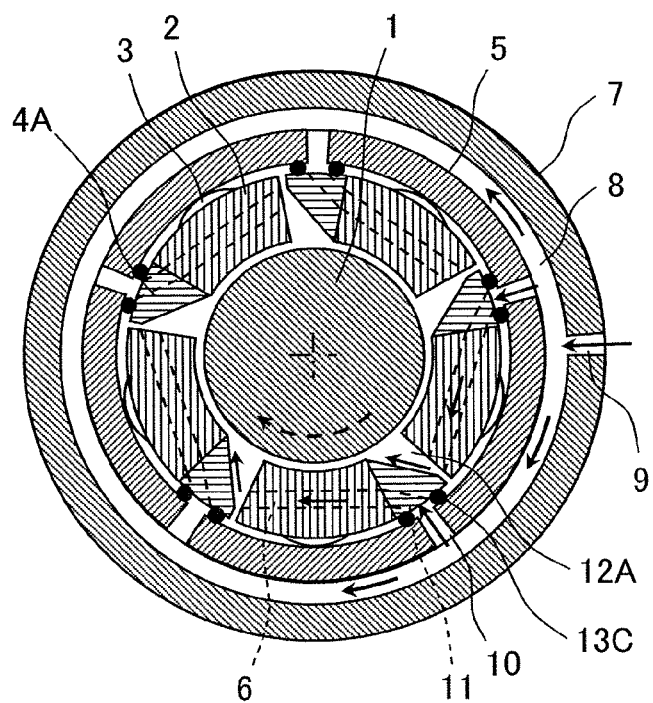
FIG. 12 is a radial cross-sectional view illustrating the structure of a tilting pad bearing according to a sixth modification of the present invention.

Although the fourth embodiment does not particularly give a description, an elastic seal member (an O-ring) 13C may be installed in a gap between each of the guides 4A and the casing 5 as in a modification illustrated in FIG. 11. This prevents the leakage of the lubricating oil led from the oil-supply hole 10 of the casing 5 to the first guide passage 11 of the guide 4A. The modification described above can further reduce the oiling quantity.

A fifth embodiment of the present invention is described with reference to FIGS. 13 and 14. The present embodiment is such that a drain-oil groove is formed in the inner circumferential surface of a pad.

Figure 13:
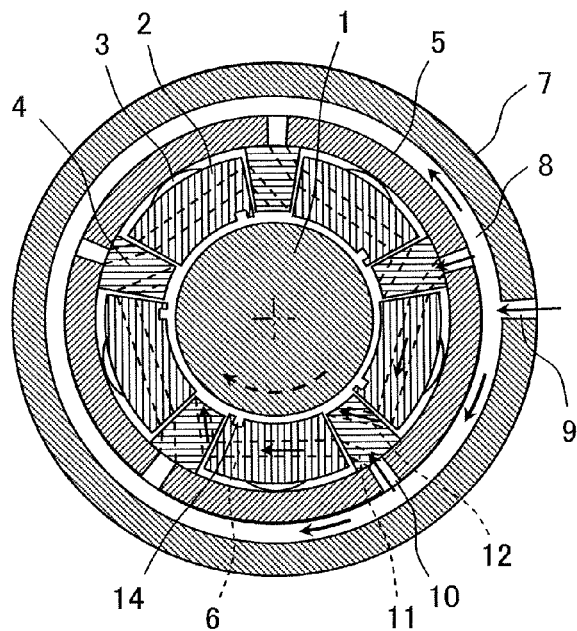
FIG. 13 is a radial cross-sectional view illustrating the structure of a tilting pad bearing according to a fifth embodiment of the present invention.
Figure 14:
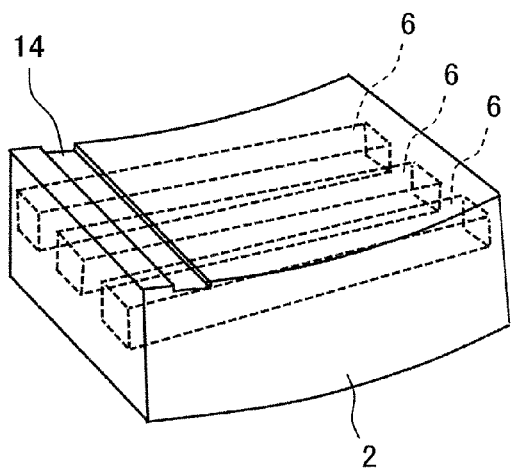
FIG. 14 is a perspective view illustrating the structure of a pad according to the fifth embodiment of the present invention.
Figure 15:
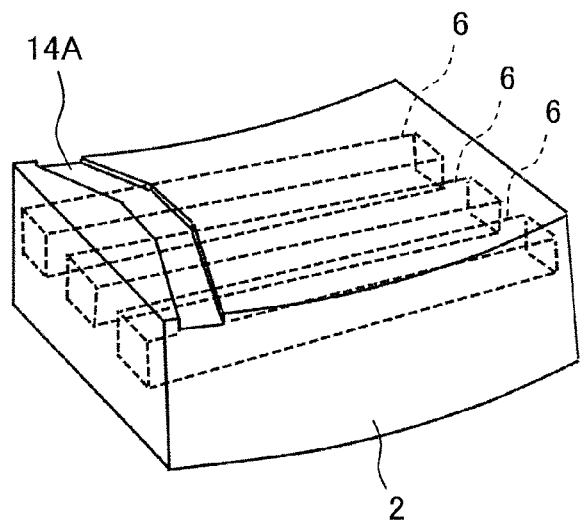
FIG. 15 is a radial cross-sectional view illustrating the structure of a pad according to a seventh modification of the present invention.

FIG. 13 is a radial cross-sectional view illustrating the structure of a tilting pad bearing according to the present embodiment. FIG. 14 is a perspective view illustrating the structure of a pad according to the present embodiment. Incidentally, the same portions in FIGS. 13 and 14 as those of the first embodiment are attached with like reference numerals and their explanations are arbitrarily omitted.

In the present embodiment, a drain-oil groove 14 is formed on a rear end side (in other words, on the downstream side in the rotational direction of the rotating shaft 1) of the inner circumferential surface of each of pads 2. This drain-oil groove 14 extends on the inner circumferential surface of the pad 2 linearly along the axial direction of the rotating shaft 1. In addition, the drain-oil groove 14 is formed to communicate with one side surface and the other side surface of the pad 2 in the axial direction of the rotating shaft 1. In this way, lubricating oil which flows from the front end side of the pad 2 into a portion (a sliding portion) between the inner circumferential surface of the pad 2 and the outer circumferential surface of the rotating shaft 1 and which reaches a high temperature is drained toward the side-surface side of the pad via the drain-oil groove 14. Thus, it is possible to prevent the high-temperature lubricating oil from flowing out from the rear end side of the pad 2 on the upstream side in the rotational direction and flowing toward the front end side of the pad 2 on the downstream side in the rotational direction. In short, cooling performance can be improved.

Also the embodiment configured as described above can reduce the oiling quantity while reducing the number of component parts similarly to the above embodiments. In addition, the drain-oil groove 14 is formed in the inner circumferential surface of each pad 2; therefore, cooling performance can be improved.

Incidentally, the fifth embodiment described above takes, as an example by applying to the first embodiment, the case where the drain-oil groove 14 is formed in the inner circumferential surface of each pad 2. However, the present invention is not limited to this. Specifically, the formation of the drain-oil groove in the inner circumferential surface of the pad 2 may be applied to any one of the second to fourth embodiments and the modifications described above. Also these cases can produce the same effects as above.

The fifth embodiment described above takes, as an example, the case where the drain-oil groove 14 extend linearly in the axial direction of the rotating shaft 1. However, the present invention is not limited to this. As in a modification illustrated in FIG. 15, a drain-oil groove 14A may extend on the downstream side in the rotational direction of the rotating shaft 1 so as to slope from its central portion toward one side and the other side in the axial direction of the rotating shaft 1. Such a modification becomes easy to drain the lubricating oil reaching a higher temperature.

The first to fifth embodiments and the modifications described above take, as an example, the case where the three oil passages 6 linearly extending from one side to the other side in the circumferential direction are formed in the inside of each pad 2. However, the present invention is not limited to this. The number of the oil passages 6 is not limited to three but may be, for example, one, two, four or more. The oil passages 6 may extend, for example, circularly along the circumferential direction. These cases can produce the same effects as above.

The first to fifth embodiments and the modifications described above take, as an example, the case where the oil passages 6 are formed in all the pads 2 and the guides 4 or 4A are each disposed between corresponding ones of all the pads 2. However, the present invention is not limited to this. Modifications are conceivable in the range not departing from the gist of the present invention. That is to say, if oil passages 6 are formed in at least two pads 2 and at least one guide 4 or 4A is disposed between the pads 2 formed with the oil passages 6, the same effects as above can be produced. One of such modifications is described with reference to FIG. 16. Incidentally, the same portions in FIG. 16 as those in the fifth embodiments are attached with like reference numerals and their explanations are arbitrarily omitted.

Figure 16:
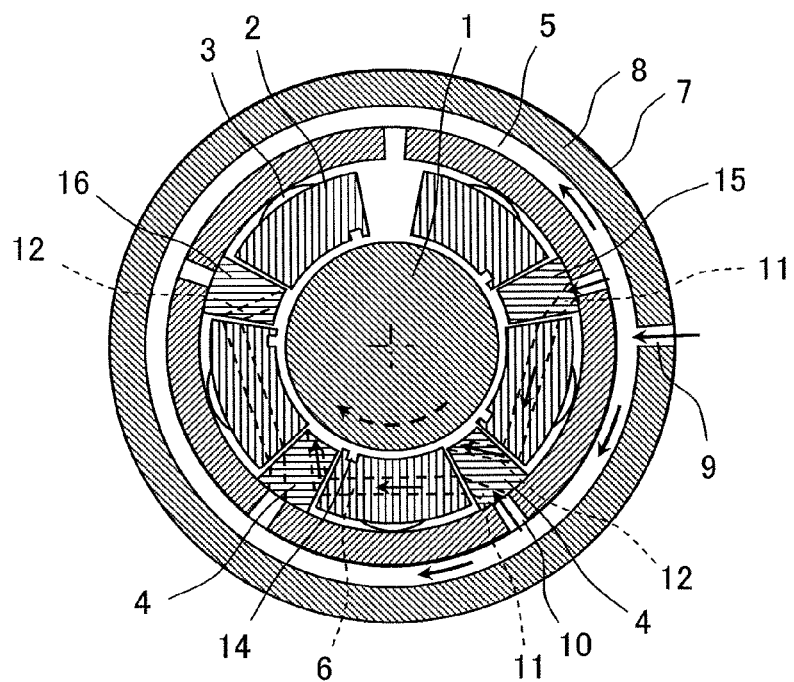
FIG. 16 is a radial cross-sectional view illustrating the structure of a tilting pad bearing according to an eighth modification of the present invention.

In the modification illustrated in FIG. 16, among five pads 2, three pads 2 on the side (the lower side in the figure) subjected to a load from the rotating shaft 1 are formed therein with oil passages 6. In addition, two first guides 4 are each disposed between corresponding ones of the three pads formed with the oil passages 6.

The first guide 4 is formed therein with the first and second guide passages 11, 12 described above.

A second guide 15 and a third guide 16 are disposed on both outsides (in other words, between the pad 2 formed with the oil passages 6 and the pad 2 not formed with the oil passages 6) of the three pads 2 each formed with the oil passages 6. The second guide 15 is formed therein with only the first guide passage 11 described above. The third guide 16 is formed therein with only the second guide passage 12 described above.

Because of the provision of the first guides 4 each formed with the first guide passage 11 and the second guide passage 12, also the modification configured as above can reduce the oiling quantity while reducing the number of component parts.

Incidentally, the modification described above takes an example by applying to the fifth embodiment. However, the present invention is not limited to this. Needless to say, the modification may be applied to each of the first to fourth embodiments and the like.

A sixth embodiment of the present invention is described with reference to FIG. 17. The present embodiment is such that the tilting pad journal bearings described above are incorporated in a steam turbine.

Figure 17:
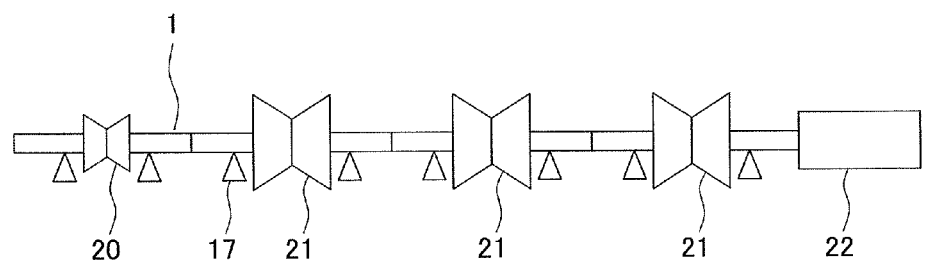
FIG. 17 is a schematic diagram illustrating the configuration of a rotating machine according to a sixth embodiment of the present invention.

FIG. 17 is a schematic diagram illustrating the configuration of a steam turbine according to the present embodiment.

In FIG. 17, the steam turbine includes a high-pressure turbine 20 rotatably driven by high-pressure steam; a plurality of (three in the present embodiment) low-pressure turbines 21 rotatably driven by low-pressure steam; and a generator 22 for converting the rotational power of the high-pressure turbine 20 and the low-pressure turbines 21 into electric energy. The high-pressure turbine 20, the low-pressure turbines 21 and the generator 22 are connected via rotating shafts 1. The rotating shafts 1 are rotatably supported by a plurality of (eight in the present embodiment) journal bearings 17.

In the present embodiment, the journal bearing 17 uses the tilting pad journal bearing according to any one of the first to fifth embodiments and the modifications described above. Thus, the journal bearing 17 is useful for countermeasures to suppress the temperature rise of a bearing sliding portion and to reduce an oiling quantity.

Incidentally, it is desirable to use the tilting pad journal bearings described above for all the journal bearings 17; however, they may be used for only the journal bearing 17 having high circumferential velocity and high surface pressure.

Figure 18:
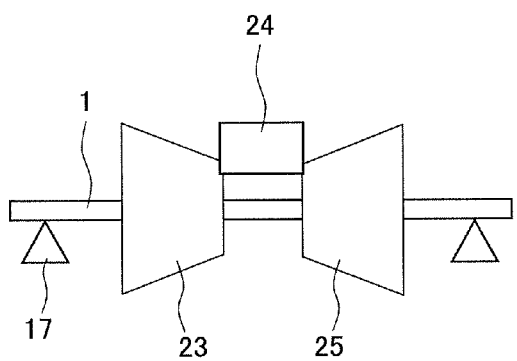
FIG. 18 is a schematic diagram illustrating the configuration of a rotating machine according to a seventh embodiment of the present invention.

A seventh embodiment of the present invention is described with reference to FIG. 18. The present embodiment is such that the tilting pad journal bearings described above are incorporated in a gas turbine.

FIG. 17 is a schematic diagram illustrating the configuration of a gas turbine according to the present embodiment.

In FIG. 17, the gas turbine includes a compressor 23 for compressing air; a combustor 24 for mixing the compressed air generated by the compressor 23 with fuel for combustion; a turbine 25 rotatably driven by the combustion gas from the combustor 24; and a generator (not shown) for converting the rotational power of the turbine 25 into electric energy. The compressor 23, the turbine 25 and the generator are connected via a rotating shaft 1. The rotating shaft 1 is rotatably supported via a plurality of journal bearings 17.

In the present embodiment, the journal bearing 17 uses the tilting pad journal bearing according to any one of the first to fifth embodiments and the modifications described above. Thus, the journal bearing 17 is useful for countermeasures to suppress the temperature rise of a bearing sliding portion and to reduce an oiling quantity. In particular, the gas turbine is generally rotated at higher speed than the steam turbine; therefore, the journal bearing 17 is useful for the gas turbine.

An eighth embodiment of the present invention is described with reference to FIG. 19. The present embodiment is such that the tilting pad journal bearings described above are each incorporated in a centrifugal compressor.

Figure 19:
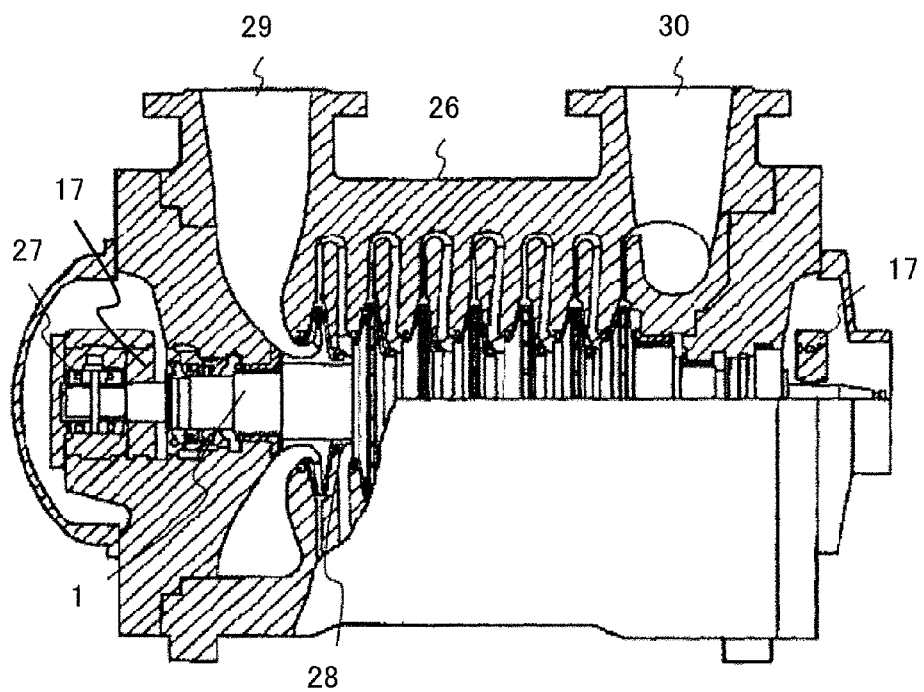
FIG. 19 is a schematic view illustrating the configuration of a rotating machine according to an eighth embodiment of the present invention.

FIG. 19 is an axial cross-sectional view illustrating the configuration of a centrifugal compressor according to the present embodiment.

In FIG. 19, the centrifugal compressor includes a compressor casing 26; a rotating shaft 1 installed in the compressor casing 26; two journal bearings 17 and a thrust bearing 27 which rotatably support the rotating shaft; and impellers 28 of multiple stages mounted on the rotating shaft 1. If the impellers 28 of multiple stages are rotated together with the rotating shaft 1, gas sucked from a suction port 29 is compressed and the compressed gas is discharged from a discharge port 30.

In the present embodiment, the journal bearing 17 uses the tilting pad journal bearing according to any one of the first to fifth embodiments and the modifications described above. Thus, the journal bearing 17 is useful for countermeasures to suppress the temperature rise of a bearing sliding portion and to reduce an oiling quantity. In particular, the centrifugal compressor is generally rotated at high speed similarly to the gas turbine; therefore, the journal bearing 17 is useful for the centrifugal compressor.

EXPLANATION OF REFERENCE NUMERALS

1: Rotating shaft
2: Pad

3: Pivot
4, 4A: Guide
5: Casing
6: Oil passage
10: Oil-supply hole
11: First guide passage
12, 12A: Second guide passage
13, 13A, 13B Elastic seal member
14, 14A: Drain-oil groove
15: Second guide
16: Third guide

The invention claimed is:

1. A tilting pad journal bearing comprising:
a plurality of pads disposed on an outer circumferential side of a rotating shaft and subjected to radial load on the rotating shaft;
a plurality of pivots each supporting a corresponding one of the plurality of pads in such a manner that the pads are tiltable; and
a casing housing the plurality of pads and the plurality of pivots;
the plurality of pads each having an oil passage formed in the inside thereof, the oil passage extending from one side to the other side in a circumferential direction;
wherein the journal bearing includes a plurality of guides each disposed between corresponding ones of the plurality of pads, and
the plurality of guides each have a first guide passage formed in the inside thereof and have a second guide passage formed in the inside thereof or between an inner circumferential surface of the guide and an outer circumferential surface of the rotating shaft, the first guide passage being adapted to introduce lubricating oil therein from an oil-supply hole of the casing and exhaust the lubricating oil to the oil passage of the pad that is adjacent to the guide and on the other side in the circumferential direction, the second guide passage being adapted to introduce lubricating oil therein from the oil passage of the pad that is adjacent to the guide and on one side in the circumferential direction and exhaust the lubricating oil to between an inner circumferential surface of the pad on the other side in the circumferential direction and the outer circumferential surface of the rotating shaft.

2. The tilting pad journal bearing according to claim 1,
wherein the second guide passage is formed between the inner circumferential surface of the guide and the outer circumferential surface of the rotating shaft, and
wherein the inner circumferential surface of the guide is formed as a sloping surface, the sloping surface extending from one side in the circumferential direction toward the other side in the circumferential direction and sloping toward a radial inside of the rotating shaft.

3. The tilting pad journal bearing according to claim 2,
wherein the plurality of guides are each secured to the casing.

4. The tilting pad journal bearing according to claim 2,
wherein the plurality of guides are each made integral with the pad that is adjacent to the guide and on the other side in the circumferential direction.

5. The tilting pad journal bearing according to claim 2,
wherein the plurality of pads are each formed with a drain-oil groove in the inner circumferential surface thereof on the rotational direction side of the rotating shaft, and
the drain-oil groove communicates with one side surface and the other side surface of the pad in the axial direction of the rotating shaft.

6. The tilting pad journal bearing according to claim 1,
wherein the plurality of guides are each secured to the casing.

7. The tilting pad journal bearing according to claim 6,
wherein a first elastic seal member is installed in a gap between the guide and the pad that is adjacent to the guide and on the other side in the circumferential direction, the first elastic seal member being adapted to prevent leakage of lubricating oil led from the first guide passage of the guide to the oil passage of the pad on the other side in the circumferential direction.

8. The tilting pad journal bearing according to claim 7,
wherein the plurality of pads are each formed with a drain-oil groove in the inner circumferential surface thereof on the rotational direction side of the rotating shaft, and
the drain-oil groove communicates with one side surface and the other side surface of the pad in the axial direction of the rotating shaft.

9. The tilting pad journal bearing according to claim 7,
wherein the second guide passage is formed in the inside of the guide, and
wherein a second elastic seal member is installed in a gap between the guide and the pad that is adjacent to the guide and on the one side in the circumferential direction, the second elastic seal member being adapted to prevent leakage of lubricating oil led from the oil passage of the pad on the one side in the circumferential direction to the second guide passage of the guide.

10. The tilting pad journal bearing according to claim 9,
wherein the plurality of pads are each formed with a drain-oil groove in the inner circumferential surface thereof on the rotational direction side of the rotating shaft, and
the drain-oil groove communicates with one side surface and the other side surface of the pad in the axial direction of the rotating shaft.

11. The tilting pad journal bearing according to claim 6,
wherein the plurality of pads are each formed with a drain-oil groove in the inner circumferential surface thereof on the rotational direction side of the rotating shaft, and
the drain-oil groove communicates with one side surface and the other side surface of the pad in the axial direction of the rotating shaft.

12. The tilting pad journal bearing according to claim 1,
wherein the plurality of guides are each made integral with the pad that is adjacent to the guide and on the other side in the circumferential direction.

13. The tilting pad journal bearing according to claim 12,
wherein an elastic seal member is installed in a gap between the guide and the casing,
the elastic seal member being adapted to prevent leakage of lubricating oil led from the oil-supply hole of the casing to the first guide passage of the guide.

14. The tilting pad journal bearing according to claim 13,
wherein the plurality of pads are each formed with a drain-oil groove in the inner circumferential surface thereof on the rotational direction side of the rotating shaft, and
the drain-oil groove communicates with one side surface and the other side surface of the pad in the axial direction of the rotating shaft.

15. The tilting pad journal bearing according to claim 12,
wherein the plurality of pads are each formed with a drain-oil groove in the inner circumferential surface thereof on the rotational direction side of the rotating shaft, and
the drain-oil groove communicates with one side surface and the other side surface of the pad in the axial direction of the rotating shaft.

16. The tilting pad journal bearing according to claim 1,
wherein the plurality of pads are each formed with a drain-oil groove in the inner circumferential surface thereof on the rotational direction side of the rotating shaft, and the drain-oil groove communicates with one side surface and the other side surface of the pad in the axial direction of the rotating shaft.

17. The tilting pad journal bearing according to claim 16, wherein the drain-oil groove extends on the rotational direction side of the rotating shaft so as to slope from a central portion thereof toward one side and the other side in the axial direction of the rotating shaft.

18. A rotating machine comprising at least one tilting pad journal bearing according to claim 1.

19. A tilting pad journal bearing comprising:

a plurality of pads disposed on an outer circumferential side of a rotating shaft and subjected to radial load on the rotating shaft;

a plurality of pivots each supporting a corresponding one of the plurality of pads in such a manner that the pads are tiltable; and a casing housing the plurality of pads and the plurality of pivots;

each of at least two pads of the plurality of pads having an oil passage formed in the inside thereof, the oil passage extending from one side in a circumferential direction to the other side in the circumferential direction;

wherein the journal bearing includes, at least one first guide disposed between the at least two pads each formed with the oil passage in the inside thereof, and a second guide and a third guide disposed on both circumferential outsides of the at least two pads each formed with the oil passage in the inside thereof, the first guide has a first guide passage formed in the inside thereof and has a second guide passage formed in the inside thereof or between an inner circumferential surface thereof and an outer circumferential surface of the rotating shaft, the first guide passage being adapted to introduce lubricating oil therein from an oil-supply hole of the casing and exhaust the lubricating oil to the oil passage of the pad that is adjacent to the first guide and on the other side in the circumferential direction, the second guide passage being adapted to introduce lubricating oil therein from the oil passage of the pad that is adjacent to the first guide and on one side in the circumferential direction and exhaust the lubricating oil to between an inner circumferential surface of the pad on the other side in the circumferential direction and the outer circumferential surface of the rotating shaft, the second guide has a first guide passage formed in the inside thereof, the first guide passage being adapted to introduce lubricating oil therein from the oil-supply hole of the casing and exhaust the lubricating oil to the oil passage of the pad that is adjacent to the second guide and on the other side in the circumferential direction, and the third guide has a second guide passage formed in the inside thereof or between an inner circumferential surface thereof and the outer circumferential surface of the rotating shaft, the second guide passage being adapted to introduce lubricating oil therein from the oil passage of the pad that is adjacent to the third guide and on the one side in the circumferential direction and exhaust the lubricating oil to between the outer circumferential surface of the rotating shaft and the inner circumferential surface of the pad that is adjacent to the third guide and on the other side in the circumferential direction.

* * * * *